US011336555B2

United States Patent
Soh et al.

(10) Patent No.: US 11,336,555 B2
(45) Date of Patent: May 17, 2022

(54) NETWORK SEGMENTATION EFFECTIVENESS SYSTEM AND METHOD

(71) Applicant: JPMORGAN CHASE BANK, N.A., New York, NY (US)

(72) Inventors: Jeremy Soh, Singapore (SG); Utsav Saraf, Singapore (SG)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/111,742

(22) Filed: Dec. 4, 2020

(65) Prior Publication Data

US 2021/0176158 A1 Jun. 10, 2021

Related U.S. Application Data

(60) Provisional application No. 62/944,490, filed on Dec. 6, 2019.

(51) Int. Cl.
 *G06F 15/16* (2006.01)
 *H04L 43/50* (2022.01)
 *H04L 43/065* (2022.01)
 *H04L 67/10* (2022.01)

(52) U.S. Cl.
 CPC ............ *H04L 43/50* (2013.01); *H04L 43/065* (2013.01); *H04L 67/10* (2013.01)

(58) Field of Classification Search
 CPC ........ H04L 43/50; H04L 43/065; H04L 67/10
 See application file for complete search history.

(56) References Cited

U.S. PATENT DOCUMENTS

| | | | | |
|---|---|---|---|---|
| 2005/0229255 | A1* | 10/2005 | Gula | H04L 63/1408 726/23 |
| 2010/0050249 | A1* | 2/2010 | Newman | G06Q 20/40 726/15 |
| 2011/0258478 | A1* | 10/2011 | Anand | G06Q 10/06 714/1 |
| 2012/0144493 | A1* | 6/2012 | Cole | H04L 63/0218 726/25 |
| 2013/0174246 | A1* | 7/2013 | Schrecker | H04L 63/1433 726/14 |
| 2017/0085579 | A1* | 3/2017 | Ionescu | H04L 63/1441 |
| 2020/0358792 | A1* | 11/2020 | Bazalgette | H04L 63/1416 |

* cited by examiner

*Primary Examiner* — Padma Mundur
(74) *Attorney, Agent, or Firm* — Greenblum & Bernstein, P.L.C.

(57) ABSTRACT

The invention relates to a network segmentation effectiveness attestation system and method. The method may comprise receiving a list of internet protocol (IP) addresses for information technology (IT) assets within a defined scope, and executing a plurality of segmentation scans from outside a cardholder data environment (CDE) using a plurality of software agents. The software agents may be deployed and orchestrated across multiple network tiers. The method may also comprise receiving, automatically interpreting, and certifying results from the segmentation scan, automatically generating a report from the results of the segmentation scan, and automatically posting the report for authorized users to access.

20 Claims, 6 Drawing Sheets

NETWORK SEGMENTATION EFFECTIVENESS SYSTEM AND METHOD

CROSS REFERENCE TO RELATED APPLICATIONS

The application claims priority to U.S. Provisional Application 62/944,490, filed Dec. 6, 2019, the contents of which are incorporated herein in their entirety.

FIELD OF THE INVENTION

The present invention relates generally to network segmentation, and more particularly to an automated system and method for providing effective network segmentation attestation.

BACKGROUND

The Payment Card Information Data Security Standard (PCI DSS) outlines detailed requirements for securing cardholder data that is stored, processed, or transmitted by merchants, banks, and other organizations. Each in-scope payment card system is required to satisfy the PCI DSS. One of the requirements in the PCI DSS is performance of network-layer penetration testing on the organization's network segmentation structure. Under Section 11.3.4.1 of the PCI DSS, this penetration testing must be conducted at least annually and after any significant infrastructure or application upgrade or modification; and at least every six months and after any changes to network segmentation controls or methods. Network segmentation refers to the process of dividing a network into smaller segments in such a way that limits or prevents communication between them. It is a security practice that enables the merchant, bank or other organization to protect its cardholder data.

With new computing environments such as cloud computing coming within the scope of the PCI DSS requirements, there is growing demand from various affected business units and stakeholders within an organization (e.g., a bank issuing credit cards) to perform PCI penetration tests. Cloud computing environments present additional challenges with respect to segmentation since there is a need to perform additional types of tests. Frequent reconfiguration of a system or platform may also require more frequent penetration tests to satisfy the major changes requirement set forth in PCI DSS 11.3.4.1. Additionally, each penetration test often requires a significant amount of coordination and effort from the intake/delivery/scheduling team within an assessment function, as well as stakeholders in the line of business, the PCI compliance team, and other teams at the bank, merchant or other organization. In a large bank, the resources that need to be devoted to penetration testing are often substantial and will only increase with the development and implementation of various new computing environments. Penetration tests are expensive and time consuming which makes it very difficult to scale to the growing demand.

Penetration testers have automated tools, such as the open-sourced Nmap, to run scans on large environments. However, Nmap is a stand-alone tool that neither has self-service nor automation out-of-the-box. Nor does it have the ability to be hosted as a service for external consumption. In addition, there is currently no technology or system to automatically certify a segmented network from a PCI perspective.

It would be desirable, therefore, to have a system and method to overcome the foregoing and other disadvantages of known systems.

SUMMARY

According to one embodiment, the invention relates to a network segmentation effectiveness attestation system and method. A network segmentation effectiveness system comprises: an electronic memory; an interactive user interface that receives user input via a communication network; and a computer processor coupled to the electronic memory and the interactive user interface and further programmed to execute the following functions: receive, by an electronic input, a list of internet protocol (IP) addresses for information technology (IT) assets within a defined scope; determine, by the computer processor, whether a classless inter-domain routing (CIDR) format associated with the list of IP addresses for IT assets and an information technology service management (ITSM) identifier refer to the same list of assets and a corresponding scope including one or more parameters; generate, by the computer processor, a notification of a segmentation scan; execute, by the computer processor, a plurality of segmentation scans from outside a cardholder data environment (CDE) using a plurality of software agents, wherein the computer processor is programmed to deploy and orchestrate the software agents across multiple network tiers; receive, by the communication network, results from the plurality of segmentation scans; transmit, by the communication network, the results of the plurality of segmentation scans to a penetration test reporting module; automatically generate, by the computer processor, a report from the results of the segmentation scan; and automatically post, by the user interface, the report for authorized users to access.

The method may be executed on a specially programmed computer system comprising one or more computer processors, electronic storage devices, and networks. The method for providing network segmentation comprises the steps of: receiving, by an electronic input, a list of internet protocol (IP) addresses for information technology (IT) assets within a defined scope; determining, by the computer processor, whether a classless inter-domain routing (CIDR) format associated with the list of IP addresses for IT assets and an information technology service management (ITSM) identifier refer to the same list of assets and a corresponding scope including one or more parameters; generating, by the computer processor, a notification of a segmentation scan; executing, by the computer processor, a plurality of segmentation scans from outside a cardholder data environment (CDE) using a plurality of software agents, wherein the computer processor is programmed to deploy and orchestrate the software agents across multiple network tiers; receiving, by a communication network, results from the plurality of segmentation scans; transmitting, by the communication network, the results of the plurality of segmentation scans to a penetration test reporting module; automatically generating, by the computer processor, a report from the results of the segmentation scan; and automatically posting, by the user interface, the report for authorized users to access.

The invention also relates to a network segmentation effectiveness system that is programmed to execute the methods described herein, and a computer readable medium containing instructions for executing the methods described herein.

Exemplary embodiments of the invention can provide a number of advantages for the penetration testing process. For example, the network segmentation effectiveness (NSE) system and method can enable a user such as a large bank to reduce segmentation penetration testing time from several weeks to minutes, e.g., for a business unit that has tens of thousands of hosts that are in scope for assessment. This greatly enhanced efficiency enables execution on extremely short notice and produces results rapidly, significantly reducing the time needed to identify compliance issues. This efficiency is achieved, in part, due to elimination of intake/scheduling processes (the system can provide an always-ready self-service or auto-triggered capability), smart optimization of the scanning tool, elimination of manual reporting, and automated validation of authorization and target scope. These and other advantages will be described further in the detailed description below.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION

Figure 1:
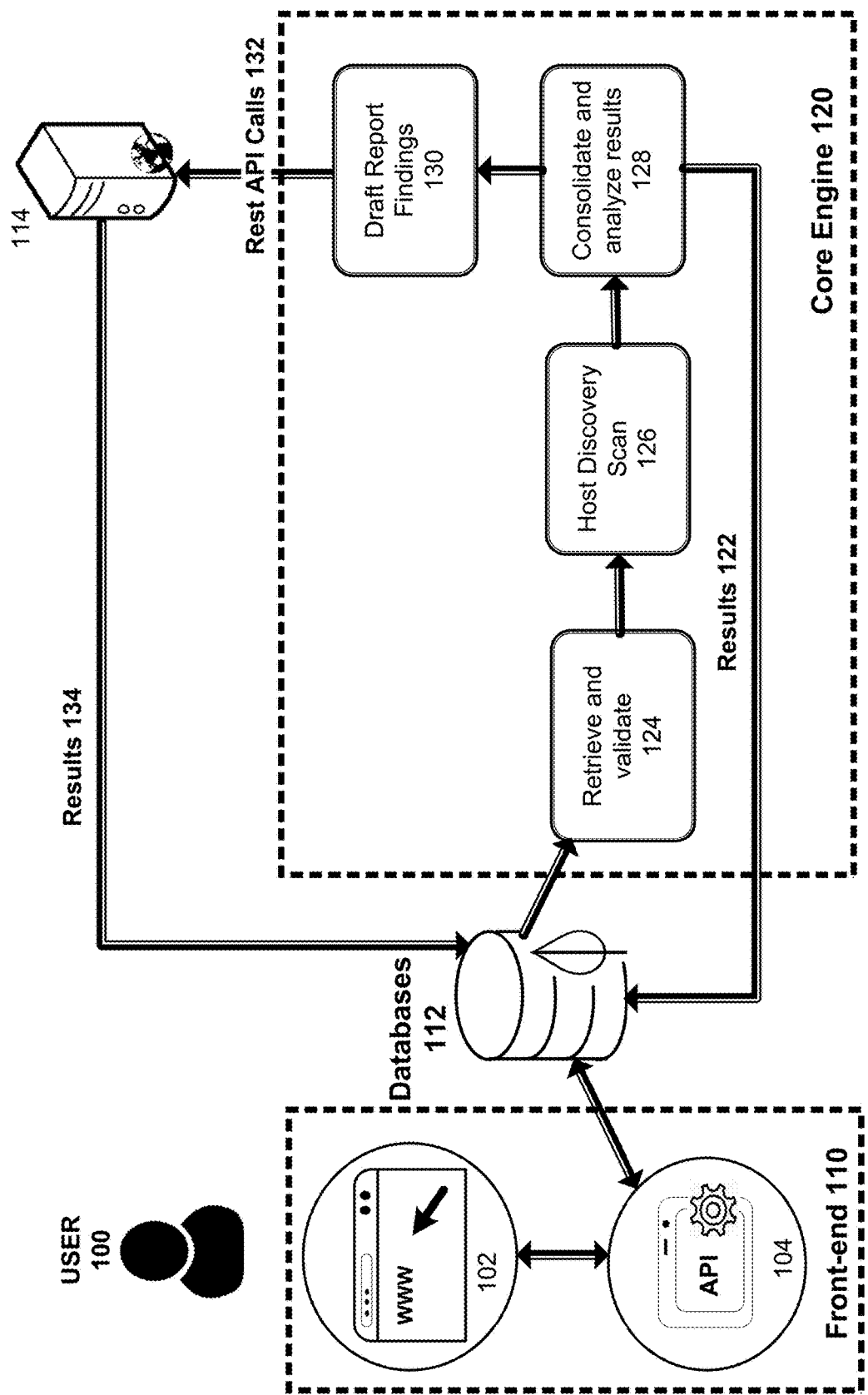
FIG. 1 is a diagram of a network segmentation effectiveness (NSE) system according to an exemplary embodiment of the invention.

Exemplary embodiments of the invention will now be described in order to illustrate various features of the invention. The embodiments described herein are not intended to be limiting as to the scope of the invention, but rather are intended to provide examples of the components, use, and operation of the invention.

Under the PCI DSS, for each in-scope payment card system, the following network-layer penetration testing requirements need to be satisfied: (1) perform external penetration testing at least annually and after any significant infrastructure or application upgrade or modification (PCI DSS 11.3.1); (2) perform internal penetration testing at least annually and after any significant infrastructure or application upgrade or modification (PCI DSS 11.3.2); (3) correct exploitable vulnerabilities found during penetration testing and repeat testing to verify corrections (PCI DSS 11.3.3); and (4) perform penetration testing on segmentation controls at least every six months and after any changes to segmentation controls/methods (PCI DSS 11.3.4.1).

Segmentation control is used to prevent out-of-scope systems from being able to communicate with systems in the Cardholder Data Environment (CDE) or impact the security of the CDE. The segmentation check is performed by conducting tests used in the initial stages of a network penetration test (e.g., host discovery, port scanning, etc.). For environments with a large number of network segments considered to be out of scope or isolated from the CDE, a representative subset can be used for testing to reduce the number of segmentation checks that need to be performed. Existing reference and scanning data from known tools such as IT inventory management systems and vulnerability assessment scanners can be used to perform an initial triage and only scan hosts that exist in the various in-scope subnets and have not already been scanned a vulnerability assessment scanner. An IT inventory management system helps the organization keep track of its IT assets, which may include network devices, employee computers or virtual computers commonly known as endpoints, and servers. The vulnerability assessment scanning tool performs scans against a computing host (e.g. network device, endpoint, server, etc.) to determine if a host is vulnerable to certain known software or configuration weaknesses.

According to one embodiment, the invention relates to an automated network segmentation effectiveness system (sometimes referred to herein as an "NSE system") and automated network segmentation effectiveness method (sometimes referred to herein as a "NSE method"). The NSE system can support an increased demand for penetration testing while enabling larger and more complex environments to be tested without compromising quality. The NSE system includes a self-service functionality, where a valid ITSM ticket alongside a list of in-scope assets can be uploaded for assessment. An ITSM ticket is usually represented by a unique identifier such as a serial number. A ticket may be raised whenever there is a change request on IT systems or network. For example, Host A needs to be patched and an ITSM ticket is commonly required to be raised in the system to facilitate tracking and determine required personnel support. According to one embodiment of the invention, an ITSM ticket may be required in an organization to track the segmentation testing in the event of potential outages or degradation of service caused by the activity. Although unlikely, it may be beneficial to have personnel standing by or at least tracked in the system to provide information to system owners or users of the change/testing activity.

To evaluate the effectiveness of network segmentation controls, the NSE system may perform a host discovery scan using an optimized configuration and parse the results automatically. According to one embodiment, for the host discovery scan, the public tool "Nmap" may be utilized as the underlying engine to perform the scan. By default configuration, the Nmap may take up to weeks to complete large networks (e.g. more than 30,000 hosts). Therefore careful tuning is required to speed up the process. In some embodiments, tuning the Nmap enables it to complete the discovery scans within minutes and still achieve 100% accuracy. According to one example, tuning may be achieved using the following Nmap parameters: min-rate; min-hostgroup; max-scan-delay; top-ports; and max-retries. According to one particular example with over 31,000 potential hosts, by adjusting the above parameters, the scan may be completed in less than a one minute and still obtain the same accuracy of a scan configuration with default settings. According to other embodiments, the parameters may be tuned to still provide fast results (e.g., approximately six minutes) while catering for potential outliers, which provides increased accuracy for exceptional cases.

According to one embodiment, automatic parsing may be used to review the results of the host discovery scan. The program logic or algorithm reviews results from the host discovery scan to determine if the target network is segmented properly. The automatic parsing may comprise, for example, the following steps: 1. If any of the hosts are connectable, that is in the event of detecting an "open" or "closed" port, the segmentation is determined to be insufficient. 2. If all hosts and all scanned ports are returned as "filtered", the segmentation is deemed effective. According to one embodiment, there are three states of the scan results: (a) Open, where the target host's port is connectable and presents a network service; (b) Closed, where the target host's port is connectable but does not present with a network service; and (c) Filtered, where the target host's port is not connectable/reachable, and it is very unlikely that the connection request was filtered or dropped by intermediary protective controls such as a firewall or an intrusion prevention system.

The NSE system may also be configured by a user to utilize tools such as IT inventory management systems and vulnerability assessment scanners for an initial triage of the scope. This option may be utilized to identify inventory or coverage gaps and enabling data to be fed back to responsible teams within an organization for action. For example, the data within the IT inventory management may not be updated or correct. Any discrepancies discovered during the triage of the scope may be valuable to the owners of the hosts such as to update their assets information on the IT inventory management system. The vulnerability assessment scanners can be programmed to regularly scan the target network, since it may be useful to know which hosts are covered and which ones are not included. This information may then be presented to the system owners to decide if they want to update the vulnerability scanning targets to include those that are not presently covered.

The output of the scan may be sent to a known penetration test reporting tool that supports REpresentational State Transfer (REST) application programming interface (API), in a standardized format. The report may be automatically generated in the desired format and made available for download on the self-service NSE system.

According to one embodiment, the NSE system can also provide for the deployment and orchestration of software agents across multiple network tiers. The software agents can serve as scan launch points to further assess the effectiveness of the segmentation controls. The software agents can send data back to a central server in the NSE system, which processes and consolidates the results. The deployment and orchestration of software agents can enable the NSE system to generate a consolidated picture of the network segmentation effectiveness, from both inbound and outbound traffic perspectives. This process can enable data synchronization and centralized management of the software agents. The communication method and protocol chosen for the orchestration can be selected to ensure minimal network configuration for agents connectivity. An agent may be deployed to another network to serve as an additional scan launch point instead of deploying another NSE server. After initial registration of the agent to the server, the agent periodically communicates with the NSE server to fetch for new instructions. Instructions may include a request to perform a host discovery scan against a specific network, provide past scan results or perform a tear-down process to uninstall the agent. The NSE server thus serves as the central point of command to issue instructions, to store scan request and results and also a scan launch point by itself.

According to one example of the invention, the NSE system can enable a reduction in segmentation testing time from approximately two weeks to only a few minutes (e.g., for a large business unit that has thousands of hosts in scope for assessment).

According to another aspect, exemplary embodiments of the invention can be applied to internal testing. Generally, internal testing cannot be fully automated due to the specific PCI DSS requirement requiring human interpretation and validation of scan results. However, elements of internal testing can be automated and efficiencies may be realized by eliminating the need for a penetration tester to physically travel to the data centers to conduct testing. This benefit can be accomplished using a remotely accessible asset within the CDE that is made available to the penetration testing team by the line of business team. According to one embodiment, a physical desktop computer or laptop computer can be used to connect directly into the CDE. According to another embodiment, elevated remote access to a system can be configured and made available specifically for the penetration test. More specifically, internal testing of the isolated CDE network usually requires the penetration tester's physical access to the data center in order perform vulnerability assessment and penetration testing (e.g., physically plug a network cable into the network switching device within the data center). However, the CDE business owner can set up a remotely accessible asset (e.g., a server machine) within the isolated CDE and configure a restrictive access for the penetration testers to remotely control within the firm's network, which eliminates the need for physical access. In such a setup, it is also possible have the NSE system integrate with tools installed on the remotely accessible asset to perform a pre-scan before the penetration tester starts the internal testing activities. The scan request can be configured on the NSE system, and the NSE system can automatically instruct various scan tools to start performing the automated activities before the manual one starts. The NSE system may be integrated with the remotely accessible asset within the CDE that has direct connection to the systems within the CDE.

According to a preferred embodiment, the NSE system executes an automated host/port discovery and vulnerability scan of the entire CDE using Nmap and vulnerability assessment scanners that support REST API. The penetration tester then connects to the provided pre-configured remotely accessible asset/host (sometimes referred to as a "foothold") within the CDE, triages the scan results and performs controlled exploitation before proceeding to reporting. With this method, a penetration tester is only required at the beginning and closing stages of the assessment, eliminating the need for him or her to be physically located in the data center while waiting for the scan to run on thousands of assets. Controlled exploitation generally refers to a human performing the manual expert decision making as opposed to an automated one, since it is rarely a good idea to allow an automated scanning tool to perform exploitation or attacks against targets as certain exploitation/attack activities may cause service degradation or even denial of service, e.g., knocking the system down. If a vulnerability is discovered in a system, the penetration tester may want to perform a proof-of-concept exploitation or an attack or a "hack" to deterministically assess if the target is indeed vulnerable. A scanner may indicate results of vulnerability, however, it is not always exploitable due to a false positive detection or certain pre-requisites were not being met to perform an exploitation.

According to another aspect, the invention provides a NSE system that can enable compliance with the external testing requirement via a continuous perimeter penetration testing process with tailored reporting for in-scope IP ranges for different business units. According to this embodiment, the NSE system can eliminate the need for discrete stand-alone external tests for PCI DSS compliance.

Exemplary embodiments of the invention can provide a number of advantages in the penetration testing process. For example, the NSE system and method can enable a user such as a large bank or other financial institution to reduce segmentation penetration testing time from several weeks to minutes, e.g., for a business unit that has tens of thousands of hosts that are in scope for assessment. The various embodiments of the present invention may be implemented by any entity (e.g., merchants, small businesses, service providers, etc.) that processes and stores credit card information. This greatly enhanced efficiency enables execution on extremely short notice and produces results rapidly, significantly reducing the time needed to identify compliance issues. This efficiency is achieved, in part, due to elimination of intake/scheduling processes (e.g., the system can provide an always-ready self-service web portal or auto-triggered capability), smart optimization of the scanning tool, automatic generation by the NSE system of the findings after scanning and analysis, and transmission to an adjacent reporting system that supports REST API to eliminate manual reporting, and automated validation of authorization and target scope, which may involve use of existing IT inventory management system to verify if a target belongs to the line of business owner or verify the ITSM ticket contains a list of affected systems to ensure that they match the input list of systems to scan. For a large target scope, in operation the NSE system can perform a complete assessment and scan/analyze all targets. In contrast to a human assessor that, due to time and resource restrictions, would typically have to sample targets certain points (ports) on the target.

Exemplary embodiments of the invention can provide other advantages in the penetration testing process. For example, the NSE system can report a list of failed IP addresses and omit vulnerability assessment scans for the hosts that fail segmentation. It can automatically generate a single report for internal, external and segmentation tests. It can be configured to allow penetration testers to perform tests remotely using a CDE foothold provided by the stakeholders in the applicable line of business. An embodiment of the present invention may greatly reduce the time required to complete the segmentation testing (e.g., from weeks to minutes) and internal testing (weeks to days). External test requirements may be fulfilled by ongoing perimeter testing. The NSE system may provide a self-service segmentation check before a retest request is made. It can also result in substantial costs savings due to reduced workload of the penetration testers.

According to other embodiments, the NSE system may be configured to include additional features and functionalities, such as: (a) testing the controls effectiveness of an isolated/segmented network outside of the PCI DSS context; (b) feeding back assets identified in the scan that do not exist in the inventory; (c) performing express discovery of assets across an organization in a few minutes to help determine certain vulnerabilities; (d) feeding back a list of assets that are not covered by existing scanning capability in an organization; (e) automating other network-layer penetration testing activities such as lateral movement, regulatory scans, and infrastructure scans; (f) integrating in a continuous integration/continuous delivery (CI/CD) pipeline and DevOps processes so that the system instance is spun-up automatically and the environment is re-paved, for example, and performing the scan, retrieving the results, analyzing the results, and auto-certifying the environment (or not); and (g) identifying exact firewall rules within an organization that are incorrect and leading to the issues identified, and offering exact remediation steps.

Referring now to the drawings, FIG. 1 is a high-level architectural diagram of a network segmentation effectiveness (NSE) system according to an exemplary embodiment of the invention. As shown in FIG. 1, the NSE system includes a core engine component 120 and a front end (Graphic User Interface) component 110. The user 100 accesses the NSE system with a personal computing device such as a desktop computer, laptop computer, tablet computer, or smart phone for example. As shown in FIG. 1, the front end of the NSE system may comprise a web-based user interface 102 such as a web browser, for example. The front end may also include one or more application programming interfaces (APIs) 104.

The NSE system also includes a core engine comprising modules for (1) retrieval and validation of request relevant parameters such as the list of IP addresses and ITSM ticket number (represented by 124); (2) a host discovery scan (represented by 126); (3) consolidation and analysis of the results (represented by 128), and (4) drafting of report findings (represented by 130). The report findings are then transmitted to the adjacent and separate reporting system (represented by 114, via 132) in order to generate a properly formatted PDF report, which is subsequently stored in the NSE database 112 after generation, as shown by 134 and 122.

Figure 2:
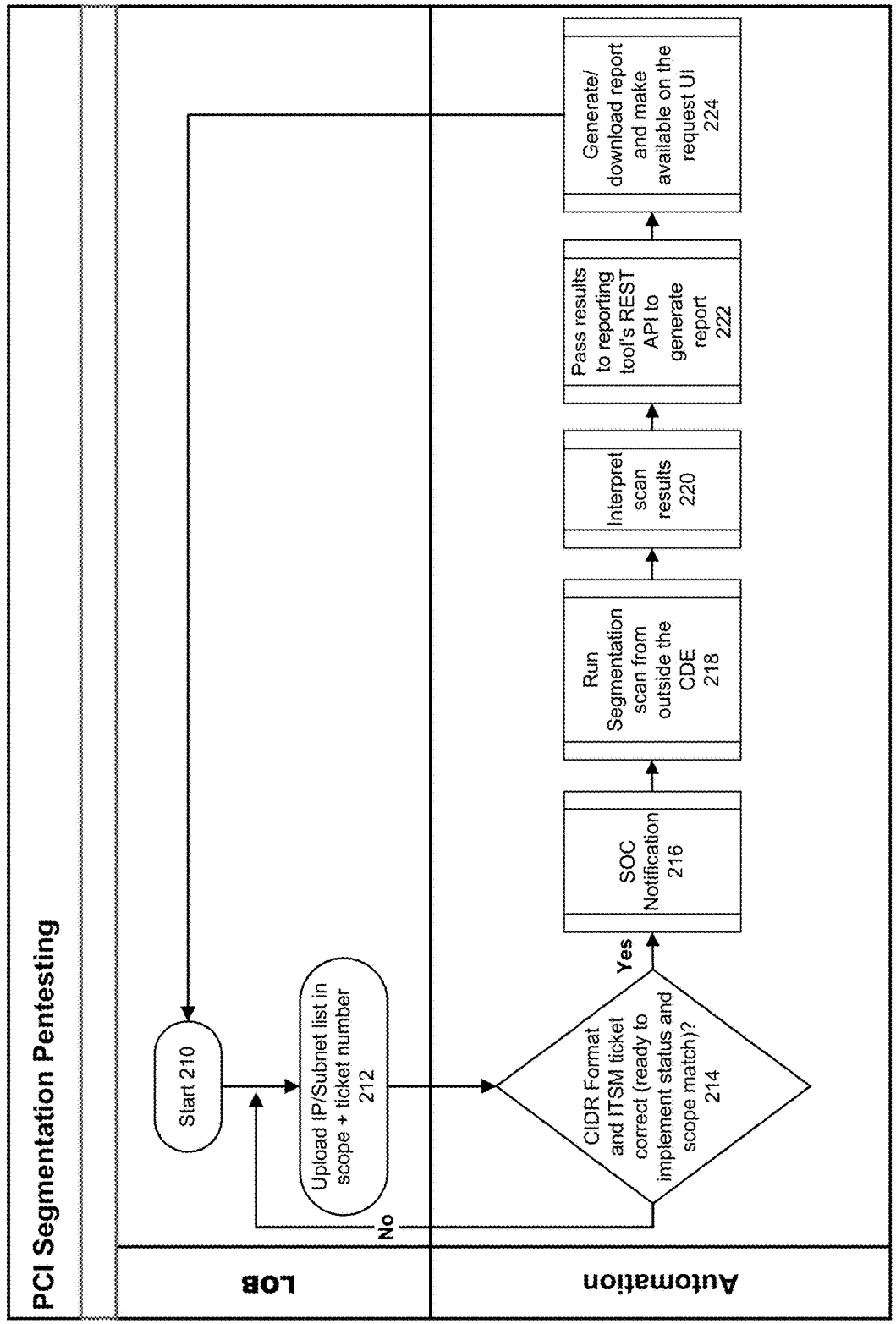
FIG. 2 illustrates a segmentation workflow executed by the NSE system according to an exemplary embodiment of the invention.

FIG. 2 illustrates a segmentation workflow executed by the NSE system according to an exemplary embodiment of the invention. As shown in FIG. 2, the process begins at the line of business (LOB) (at step 210), where a user of the LOB uploads an internet protocol (IP)/subnet list that is in scope as well as an ITSM number, at step 212. The NSE system checks that the classless inter-domain routing (CIDR) format and ITSM ticket number are correct, at step 214. This may involve determining whether the CIDR format and the ITSM refer to the same set of assets and/or same scope.

The CIDR format refers to a standardized representation to identify addresses of computer devices that are connected to the network. For example, a measure of validity (or correctness) of the IP address may be based on RFC 4632 which determines whether an IP address has a valid range or boundary. For example, 10.1.1.1/24 subnet is valid whereas 10.1.1.1/33 is invalid because a valid range is between 1 and 32. In other words, 33 is outside the range. In another example, 10.1.1.20 address is valid, but not 10.1.1.300, as the range of each octets is within 0 to 255.

According to an exemplary embodiment, an ITSM ticket may be raised to inform a change request (or in this case, a network segmentation scan). The ITSM ticket may require approval from asset owners to allow the activity. In addition, the ITSM ticket may contain parameters relating to time of activities, scope of activities (e.g., in terms of IP addresses/subnets), and the state it is in.

For example, an exemplary ITSM ticket may include: period of change activity (e.g. 23. Nov. 2020 0000 HRS to 27 Nov. 2020 2359 HRS GMT+8); status (e.g. waiting for approvals, or 'Ready to Implement' that is the last stage); scope, usually in terms of hostname or IP addresses (e.g., 172.100.2.0/24 subnet, 10.1.1.200, 10.1.1.211) and the activity or activities themselves. If time to initiate scan falls outside of the valid period of change or the status is not 'ready', or the target is not part of the ITSM scope list, system should not allow scan to start. Other information and variations may be provided.

For example, a user may have submitted a list of IP addresses or network subnets of hosts to be scanned to the NSE system, according to an embodiment of the present invention. The user may have also raised an ITSM ticket which requires the information of target in scope, also in the form of IP addresses or network subnets, to inform the organization that a test is going to take place. The ITSM information may be retrieved via the ITSM ticketing system (e.g., web page, etc.) by specifying the number that is the unique identification for the ticket. Matching the user's submitted input list and the information provided by the ITSM, the NSE system may then verify that information to ensure that they are the same.

If the answer is no (CIDR format or ITSM ticket number is not correct), then the process reverts back to the uploading the IP/subnet list and ITSM number. If the answer is yes, then the NSE system is ready to implement a status and scope match. The process then proceeds to the steps of notification of the security operations center (SOC) (at step 216); running one or more segmentation scans from outside the cardholder data environment (CDE) (at step 218); interpretation of the scan results (at step 220); passing the results to the penetration test reporting tool via a set of REST APIs to write a report (at step 222); and generating and downloading the report (at step 224), e.g., in PDF format, and making the report available on a request user interface (UI) of the NSE system.

Figure 3:
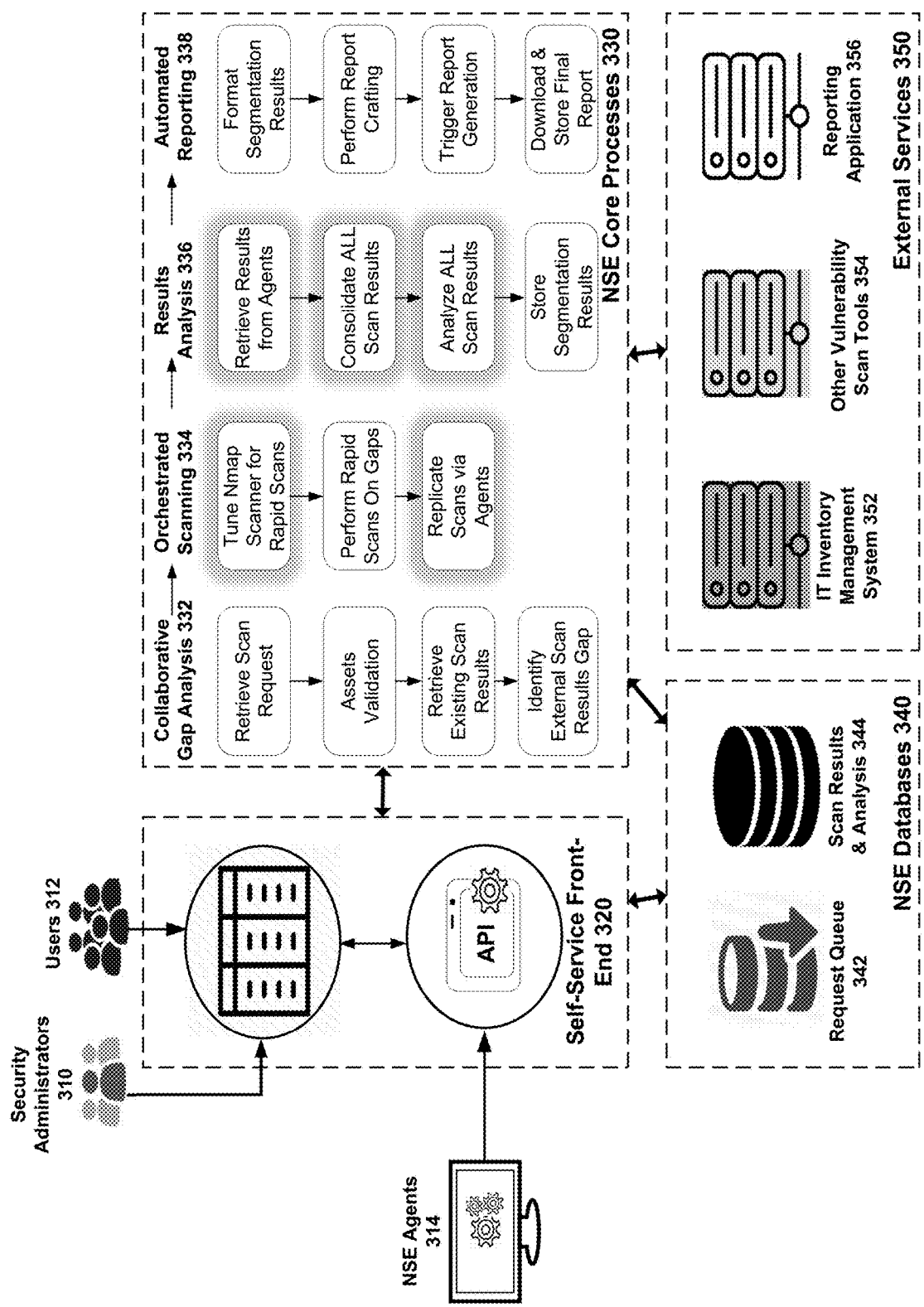
FIG. 3 illustrates an architecture diagram (without flow) of the NSE system according to an exemplary embodiment of the invention.

FIG. 3 illustrates an architecture diagram (without flow) of the NSE system according to an exemplary embodiment of the invention. As shown in FIG. 3, the NSE system includes a self-service front end 320, a set of databases (NSE Database 340), Request Queue 342 and Scan Results & Analysis 344, and a core engine that executes a number of core processes, represented by NSE Core Processes 330. The self-service front end of the NSE system may comprise a web-based user interface such as a web browser. Different types of users and system administrators can access the NSE system using a personal computing device such as a desktop computer, laptop computer, tablet computer, or mobile phone, for example. The front end may also include one or more application programming interfaces (APIs) that serve as an interface between the web-based user interface, the system databases (represented by 340), the software agents (represented by 314), and the core engine (represented by 330). The APIs can also be used in connection with deploying the software agents.

The core engine may comprise a number of modules to execute functions for the NSE system. For example, as shown in FIG. 3, the core engine may perform various processes, represented as NSE Core Processes 330. For example, the core engine may perform collaborative gap analysis 332 that involves retrieving scan requests, validation of assets, retrieval of existing scan results, and identifying one or more external scan results gaps. The core engine may perform orchestrated scanning 334 that involves tuning an Nmap scanner for rapid scans, performing rapid scans on gaps, and replicating scans via software agents. The core engine may execute results analysis 336 that involves retrieving results from agents, consolidating all scan results, analysis of the scan results, and storing the segmentation results. The core engine may provide automated reporting 338 that involves formatting the segmentation results, performing report crafting, triggering report generation, and downloading and storing a final report.

As shown in FIG. 3, scan results and analysis may be stored in Scan Results & Analysis 344. Security administrators (represented by 310), a type of users, may configure the access control of users to specify and determine "who" can access "what." Users 312 with appropriate permissions may submit queries which are added to a Request Queue 342. External Services 350 may be used with the NSE system, such as IT inventory management systems 352, other vulnerability scan tools 354, and reporting applications 356.

Figure 4:
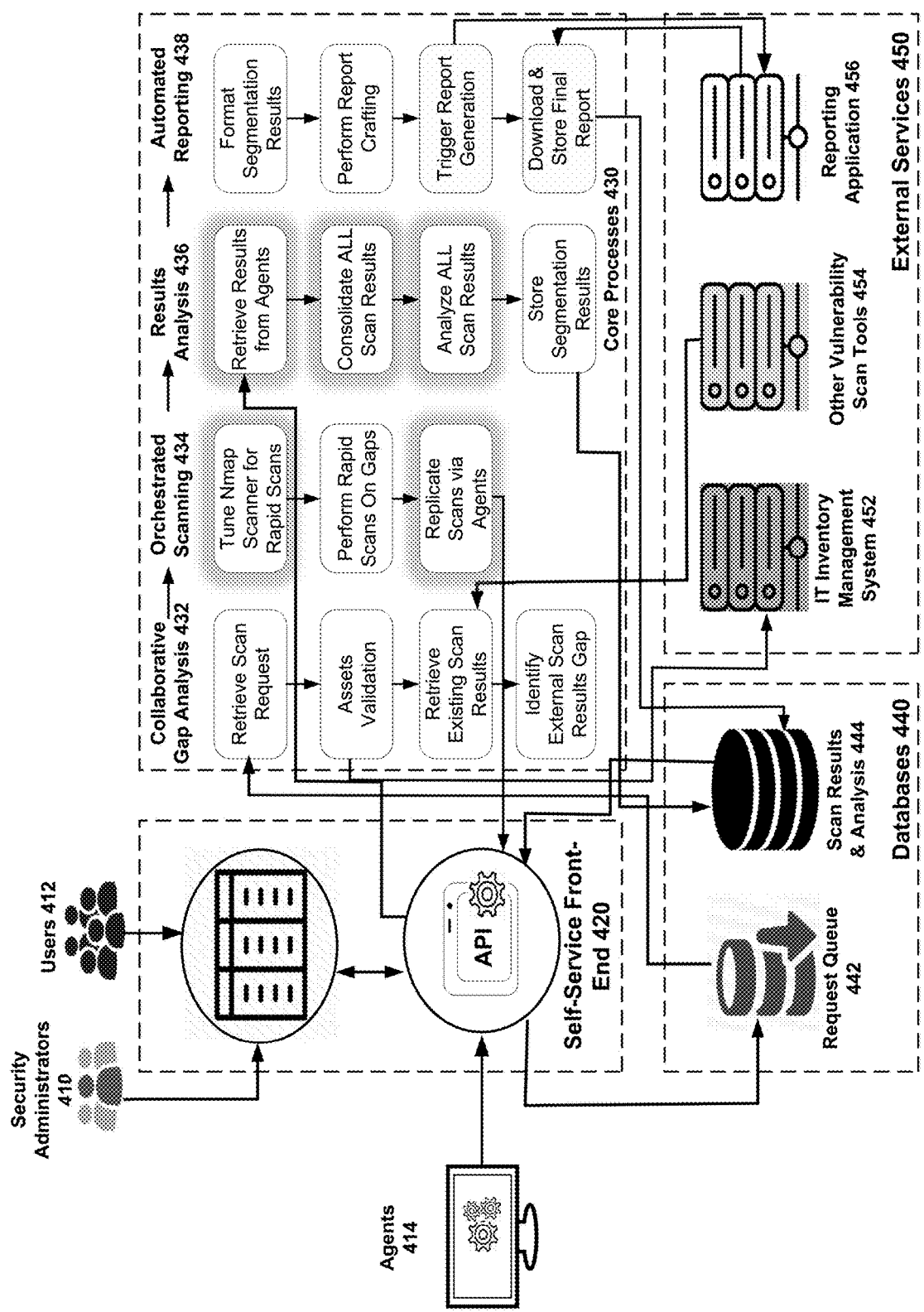
FIG. 4 illustrates an architecture diagram (with data flows indicated) of the NSE system according to an exemplary embodiment of the invention.

FIG. 4 illustrates an architecture diagram of the NSE system, with data flows indicated, according to an exemplary embodiment of the invention. In the event where a request is submitted via the self-service front-end 420, the request is stored in the "request queue" portion (442) of the database, represented by Databases 440. Requests may be submitted by Administrators 410 and Users 412. A core engine may retrieve the request alongside the input parameters and list of assets or networks to be scanned. The core engine may then validate the assets and identify scan gap by retrieving information from external services 450 such as an IT inventory management system 452 or other vulnerability scan tools 454. When the target scope is confirmed, the NSE system may tune the parameters of the Nmap scanner and perform the host discovery scans. The NSE system may also queue commands to instruct agents to perform the same type of scans with the same in-scope targets but from a different network location where the agent is installed. Core Processes 430 may include Collaborative Gap Analysis 432, Orchestrated Scanning 434, Results Analysis 436 and Automated Reporting 438. External Services 450 may include IT Inventory Management System 452, Other Vulnerability Scan Tools 454 and Reporting Application 456.

As shown in FIG. 4, the NSE system may retrieve scan results from agents (represented by 414) previously instructed to perform the host discovery scan and consolidate them with its own. The NSE system may then analyze the consolidated scan results and store them in the database (represented by 444) for future references. The NSE system may proceed to format and write the results as report findings via an external service such as the reporting application 456 which supports REST API. The report may then be generated by the NSE system, and downloaded to be stored in the NSE databases. Users may then download the verbose technical scan logs or the generated PDF reports.

Figure 5:
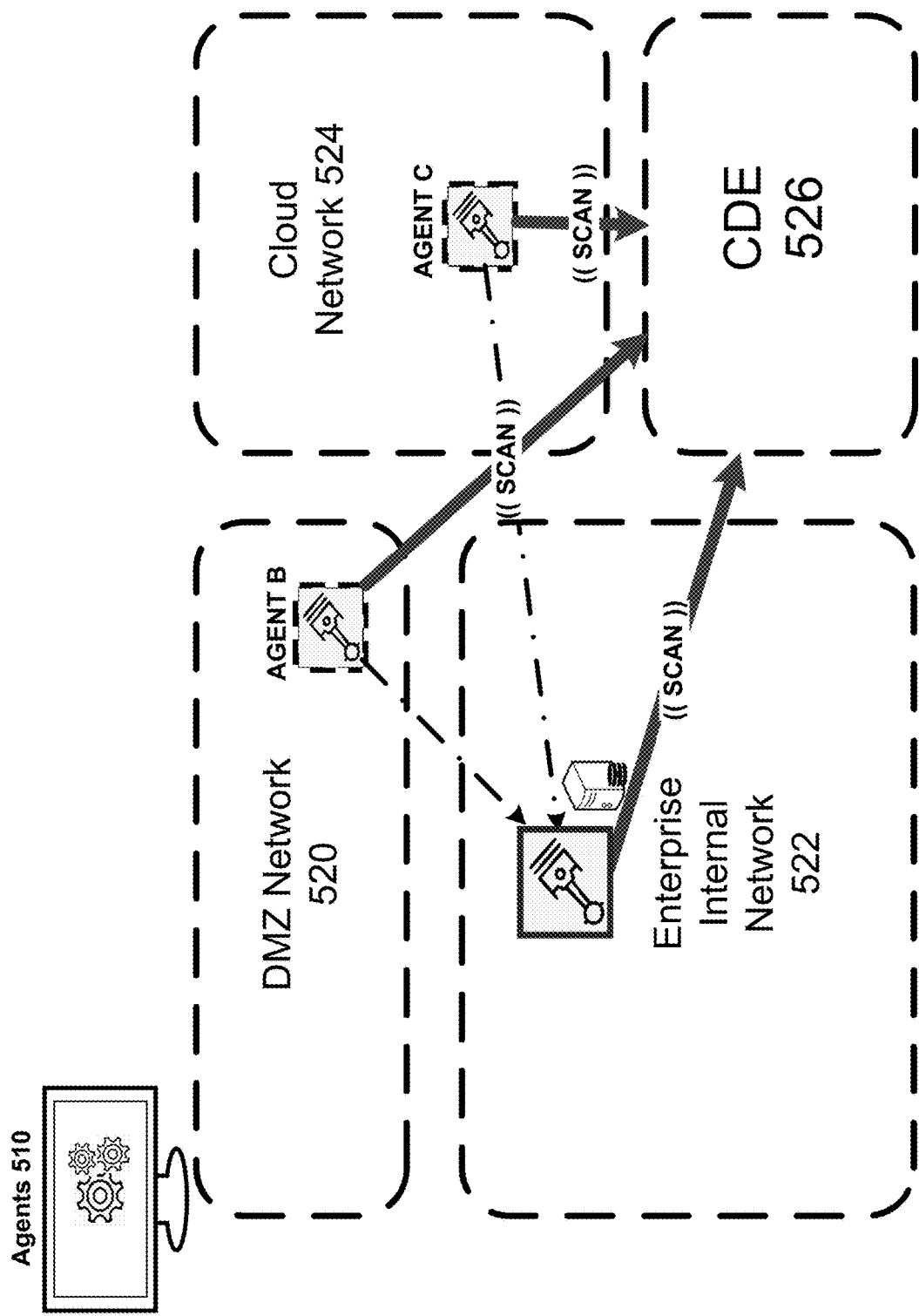
FIG. 5 illustrates an example of the deployment and operation of software agents in the NSE system according to an exemplary embodiment of the invention.

FIG. 5 illustrates an example of the deployment and operation of the software agents in the NSE system according to an exemplary embodiment of the invention. As shown in FIG. 5, the NSE system's main server may be deployed to the main enterprise internal network (represented by 522) while software agents 510 may be deployed to other sub-networks such as the demilitarized zone (DMZ) network 520, or the cloud network 524. For example, an embodiment of the present invention may be integrated with an application or enterprise software or suite of products/services. Once deployed, they can perform scans on the segmentation effectiveness of the cardholder data environment (CDE) 526 from different perspectives in the network. The software agents may also collect and transmit the scan results back to the NSE system's main server, consolidated with the main server's results and stored in the databases for analysis and reporting to the users of the NSE system.

Figure 6:
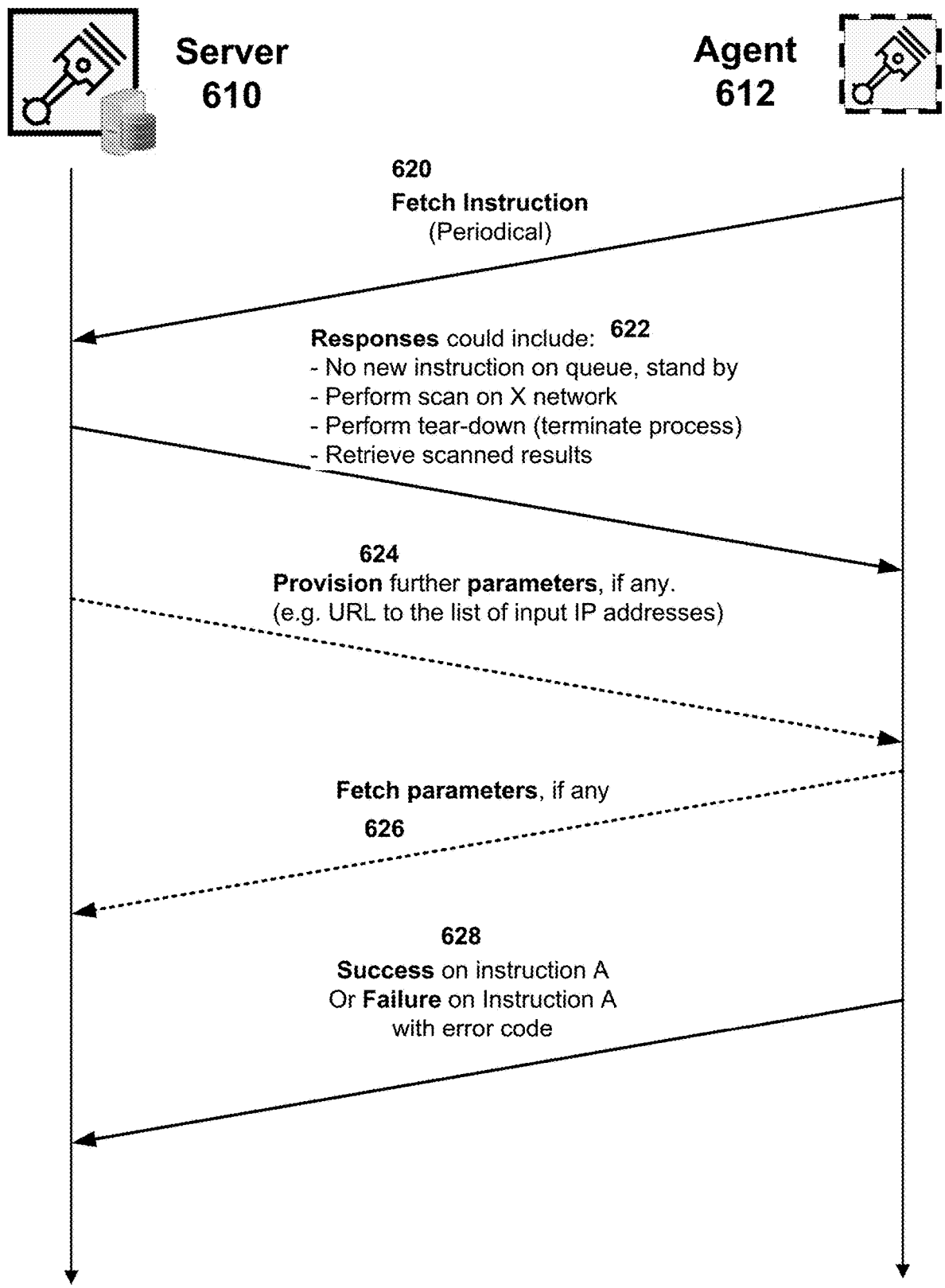
FIG. 6 illustrates an example of the communications between the NSE system's main server and agents, according to an exemplary embodiment of the invention.

FIG. 6 illustrates an example of the communications between the NSE system's main server 610 and agents 612, according to an exemplary embodiment of the invention.

The agent may be deployed on a different sub-network to periodically fetch instructions from the main server, at 620. At 622, the responses from the main server may include scan instructions, tear-down command, request previously scanned results or simply to continue standing by. Certain instructions may further persist the communication channel to include transmission of scan request parameters such as URL containing IP addresses or network subnets. At 624, parameters may be provisioned. Parameters may then be fetched at 626. Finally, for each instruction performed, the agent may transmit back to the main server a success or failure with other error messages, if required, at 628.

Those skilled in the art will appreciate that the system diagrams discussed above are merely examples of a NSE system configuration and are not intended to be limiting. Other types and configurations of networks, servers, databases and personal computing devices (e.g., desktop computers, tablet computers, mobile computing devices, smart phones, etc.) may be used with exemplary embodiments of the invention. Although the foregoing examples show the various embodiments of the invention in one physical configuration; it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. The components of the various embodiments may be arranged at any location or locations within a distributed network without affecting the operation of the respective system.

Data and information maintained by the servers and personal computers shown in the figures may be stored and cataloged in one or more databases, which may comprise or interface with a searchable database and/or a cloud database. The databases may comprise, include or interface to a relational database. Other databases, such as a query format database, a Standard Query Language (SQL) format database, a storage area network (SAN), or another similar data storage device, query format, platform or resource may be used. The databases may comprise a single database or a collection of databases. In some embodiments, the databases may comprise a file management system, program or application for storing and maintaining data and information used or generated by the various features and functions of the systems and methods described herein.

The communications network in the figures may be comprised of, or may interface to any one or more of, for example, the Internet, an intranet, a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, an Asynchronous Transfer Mode (ATM) connection, a Fiber Distributed Data Interface (FDDI) connection, a Copper Distributed Data Interface (CDDI) connection, or an optical/DWDM network.

The communications network in the figures may also comprise, include or interface to any one or more of a Wireless Application Protocol (WAP) link, a Wi-Fi link, a microwave link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Bluetooth radio link, or an IEEE 802.11-based radio frequency link. The communications network may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection. In some embodiments, the communication network may comprise a satellite communications network, such as a direct broadcast communication system (DBS) having the requisite number of dishes, satellites and transmitter/receiver boxes, for example.

Although examples of servers and personal computing devices are described and/or shown in the figures, exemplary embodiments of the invention may utilize other types of communication devices whereby a user may interact with a network that transmits and delivers data and information used by the various systems and methods described herein. The personal computing devices may include desktop computers, laptop computers, tablet computers, smart phones, and other mobile computing devices, for example. The servers and personal computing devices may include a microprocessor, a microcontroller or other device operating under programmed control. These devices may further include an electronic memory such as a random access memory (RAM), electronically programmable read only memory (EPROM), other computer chip-based memory, a hard drive, or other magnetic, electrical, optical or other media, and other associated components connected over an electronic bus, as will be appreciated by persons skilled in the art. The mobile device and personal computing device may be equipped with an integral or connectable liquid crystal display (LCD), electroluminescent display, a light emitting diode (LED), organic light emitting diode (OLED) or another display screen, panel or device for viewing and manipulating files, data and other resources, for instance using a graphical user interface (GUI) or a command line interface (CLI). The mobile device and personal computing device may also include a network-enabled appliance or another TCP/IP client or other device. The personal computing devices may include various connections such as a cell phone connection, WiFi connection, Bluetooth connection, satellite network connection, and/or near field communication (NFC) connection, for example.

As described above, the figures include a number of servers and personal computing devices, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software. The modules described above may comprise software, firmware, hardware, or a combination of the foregoing.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers and personal computing devices in the figures may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, dBase, Forth, HTML, Android, iOS, .NET, Python, Java, Modula-2, Pascal, Prolog, REXX, Visual Basic, R, and/or JavaScript. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

In the system and method of exemplary embodiments of the invention, a variety of "user interfaces" may be utilized to allow a user to interface with the personal computing devices. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A network segmentation effectiveness system comprising:
    an electronic memory;
    an interactive user interface that receives user input via a communication network; and
    a computer processor coupled to the electronic memory and the interactive user interface and further programmed to execute the following functions:
        receive, by an electronic input, a list of internet protocol (IP) addresses in a classless inter-domain routing (CIDR) format corresponding to information technology (IT) assets within a defined scope;
        receive a unique information technology service management (ITSM) identifier defining a requested network segmentation scan, the definition comprising one or more parameters detailing timing and scope;
        verify, by the computer processor, correctness of the CIDR format associated with the list of IP addresses and the ISTM identifier by determining that the CIDR format and the one or more scope parameters of the ISTM refer to the same list of IT assets;
        generate, by the computer processor, a notification of a segmentation scan based on the IP addresses and ITSM identifier;
        execute, by the computer processor, a plurality of segmentation scans on the IT assets corresponding to the IP addresses from outside a cardholder data environment (CDE) using a plurality of software agents, wherein the computer processor is programmed to deploy and orchestrate the software agents across multiple network tiers;
        receive, by the communication network, results from the plurality of segmentation scans;
        transmit, by the communication network, the results of the plurality of segmentation scans to a penetration test reporting module;
        automatically generate, by the computer processor, a report from the results of the segmentation scan; and automatically post, by the user interface, the report for authorized users to access.

2. The system of claim 1, wherein the function to receive results from the plurality of segmentation scans further comprises:

automatically interpret and certify the results of the plurality of segmentation scans.

3. The system of claim 1, wherein the function to execute a plurality of segmentation scans further comprises: perform a collaborative gap analysis that identifies one or more external scan results gaps.

4. The system of claim 3, wherein the function to execute a plurality of segmentation scans further comprises: perform orchestrated scanning that performs rapid scans on the one or more external scan results gaps.

5. The system of claim 1, wherein the function to execute a plurality of segmentation scans further comprises: replicate one or more scans via one or more software agents from the plurality of software agents.

6. The system of claim 1, wherein the plurality of software agents are deployed to one or more sub-networks comprising a demilitarized zone (DMZ) network.

7. The system of claim 1, wherein the plurality of software agents are deployed to one or more sub-networks comprising a cloud network.

8. The system of claim 1, wherein the plurality of software agents fetch instructions comprising one or more of: a request to perform a host discovery scan against a specific network, provide past scan results and perform a tear-down process to uninstall a software agent.

9. The system of claim 1, wherein the notification is sent to a security operations center (SOC).

10. The system of claim 1, wherein the defined scope relates to one or more Payment Card Information Data Security Standard (PCI DSS) requirements.

11. A method for providing network segmentation, the method comprising the steps of:

receiving, by an electronic input, a list of internet protocol (IP) addresses in a classless inter-domain routing (CIDR) format corresponding to information technology (IT) assets within a defined scope;

receiving a unique information technology service management (ITSM) identifier defining a requested network segmentation scan, the definition comprising one or more parameters detailing timing and scope;

verifying determining, by the computer processor, correctness of the CIDR format associated with the list of IP addresses and the ISTM identifier by determining that the CIDR format and the one or more scope parameters of the ISTM refer to the same list of IT assets;

generating, by the computer processor, a notification of a segmentation scan based on the IP addresses and ITSM identifier;

executing, by the computer processor, a plurality of segmentation scans on the IT assets corresponding to the IP addresses from outside a cardholder data environment (CDE) using a plurality of software agents, wherein the computer processor is programmed to deploy and orchestrate the software agents across multiple network tiers;

receiving, by a communication network, results from the plurality of segmentation scans;

transmitting, by the communication network, the results of the plurality of segmentation scans to a penetration test reporting module;

automatically generating, by the computer processor, a report from the results of the segmentation scan; and automatically posting, by the user interface, the report for authorized users to access.

12. The method of claim 11, further comprising the step of:

automatically interpreting and certifying the results of the plurality of segmentation scans.

13. The method of claim 11, wherein executing a plurality of segmentation scans further comprises: performing a collaborative gap analysis identifies one or more external scan results gaps.

14. The method of claim 13, wherein executing a plurality of segmentation scans further comprises: performing an orchestrated scanning that performs rapid scans on the one or more external scan results gaps.

15. The method of claim 11, wherein executing a plurality of segmentation scans further comprises: replicating one or more scans via one or more software agents from the plurality of software agents.

16. The method of claim 11, wherein the plurality of software agents are deployed to one or more sub-networks comprising a demilitarized zone (DMZ) network.

17. The method of claim 11, wherein the plurality of software agents are deployed to one or more sub-networks comprising a cloud network.

18. The method of claim 11, wherein the plurality of software agents fetch instructions comprising one or more of: a request to perform a host discovery scan against a specific network, provide past scan results and perform a tear-down process to uninstall a software agent.

19. The method of claim 11, wherein the notification it sent to a security operations center (SOC).

20. The method of claim 11, wherein the defined scope relates to one or more Payment Card Information Data Security Standard (PCI DSS) requirements.

* * * * *